(12) United States Patent
Yoshida et al.

(10) Patent No.: US 7,243,490 B2
(45) Date of Patent: Jul. 17, 2007

(54) 4-CYCLE ENGINE FOR MOTORCYCLE

(75) Inventors: Koji Yoshida, Hamamatsu (JP); Kazutatsu Suzuki, Hamamatsu (JP); Yoshikazu Matsui, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 97 days.

(21) Appl. No.: 10/732,423

(22) Filed: Dec. 9, 2003

(65) Prior Publication Data

US 2004/0123591 A1 Jul. 1, 2004

(30) Foreign Application Priority Data

Dec. 25, 2002 (JP) ............... 2002-375229

(51) Int. Cl.
*F01N 3/10* (2006.01)
(52) U.S. Cl. ............... 60/305; 60/292; 60/293; 60/304; 123/65 PE; 123/585
(58) Field of Classification Search ............... 60/289, 60/292, 293, 304, 305; 123/52.4, 73 V, 65 PE, 123/585
See application file for complete search history.

(56) References Cited

U.S. PATENT DOCUMENTS

| | | | | | |
|---|---|---|---|---|---|
| 4,437,306 A | * | 3/1984 | Ikenoya et al. | ............... | 60/293 |
| 4,476,676 A | * | 10/1984 | Ikenoya et al. | ............... | 60/290 |
| 4,499,724 A | * | 2/1985 | Ikenoya et al. | ............... | 60/290 |
| 4,727,717 A | * | 3/1988 | Ikenoya et al. | ............... | 60/293 |
| 5,657,628 A | * | 8/1997 | Takeuchi | ............... | 60/293 |
| 6,382,197 B1 | * | 5/2002 | Matsumoto | ............... | 123/585 |

FOREIGN PATENT DOCUMENTS

| | | |
|---|---|---|
| JP | 57-79212 | 5/1982 |
| JP | 2000-87739 | 3/2000 |
| JP | 2001-50044 | 2/2001 |

OTHER PUBLICATIONS

Patent Abstracts of Japan for JP57-79212 published on May 18, 1982.
Patent Abstracts of Japan for JP2000-87739 published on Mar 28, 2000.
Patent Abstracts of Japan for JP2000-087739 published on Mar. 28, 2000.
"Motorcycle Service Manual" for Kawasaki Z1000, 2002 KAwasaki Heavy Industries, Ltd., Second Edition (2): Jun. 31, 2003 (K).

* cited by examiner

Primary Examiner—Binh Q. Tran
(74) Attorney, Agent, or Firm—Darby & Darby

(57) ABSTRACT

A 4-cycle engine for a motorcycle has a secondary-air supplier for supplying secondary air to exhaust ducts. The engine includes a recess, which is depressed toward the engine, on a cylinder-head cover for holding a control valve of the secondary-air supplier. The recess and the control valve are positioned between two innermost cylinders of the array of the cylinders. Check valves, which are connected to downstream regions of the control valve, are each disposed between two outermost cylinders of the array of the cylinders.

10 Claims, 9 Drawing Sheets

To Exhaust Port 9

4-CYCLE ENGINE FOR MOTORCYCLE

BACKGROUND OF THE INVENTION

1. Field of the Invention

The present invention relates to a 4-cycle engine for a motorcycle having a secondary-air supplier that supplies secondary air to exhaust ducts for purging exhaust gas.

2. Description of the Related Art

Conventional 4-cycle engines for motorcycles disclosed in, for example, Japanese Unexamined Patent Application Publication No. 57-79212, Japanese Unexamined Patent Application Publication No. 2000-87739, and Japanese Unexamined Patent Application Publication No. 2001-50044 each have a control valve and check valves provided near the upper portion of a cylinder-head cover. The control valve controls the intake of secondary air and the check valves prevent the backflow of the secondary air.

Because these valves are disposed near the cylinder-head cover, the layout in the vicinity of the engine is highly limited. To prevent an air cleaner disposed directly above the cylinder-head cover from interfering with the control valve and the check valves, which protrude upward from the cover, the air cleaner requires a recessed region in its structure. This inevitably reduces the volume of the air cleaner.

SUMMARY OF THE INVENTION

An object of the present invention is to provide a 4-cycle engine for a motorcycle, including a secondary-air supplier with a compact structure that contributes to less limitations of the layout in the vicinity of the engine without reducing the volume of an air cleaner. At the same time, the 4-cycle engine of the present invention achieves improvements in, for example, the negative-pressure response in the secondary-air supplier, the noise reduction of the engine, the reduction in the number of components, the recyclability of the components, the maintenance ability, and the assembly of the components.

To achieve the above-mentioned object, a 4-cycle engine for a motorcycle according to an aspect of the present invention having a secondary-air supplier for supplying secondary air into exhaust ports includes a recess on a cylinder-head cover which is depressed toward the engine for holding a control valve. The control valve of the secondary-air supplier is disposed in this recess.

This structure prevents the control valve from protruding largely from the cylinder-head cover. Accordingly, a compact secondary-air supplier is provided that achieves less limitations of the layout in the vicinity of the engine without reducing the volume of the air cleaner.

The 4-cycle engine for a motorcycle according to the present invention may preferably be an in-line, multi-cylinder engine having at least four cylinders. In this case, the recess and the control valve may be disposed between two innermost cylinders of the array of the cylinders. Downstream regions of the control valve may be connected to check valves each of which may be disposed between two outermost cylinders of the array of the cylinders. This structure also prevents the control valve and the check valves from protruding greatly from the cylinder-head cover, whereby a compact secondary-air supplier is provided.

The recess may be disposed at a corner defined by the top surface and one of the side surfaces of the cylinder-head cover and may be disposed between cams each provided in one of adjacent cylinders. Furthermore, the recess may be disposed near a rotating orbit of a lobe tip of one of the cams viewed from an axis of a camshaft. Through this structure, the dead spaces in the engine are used effectively to improve the layout in the vicinity of the engine.

In this 4-cycle engine, an upstream tube extending from the air cleaner and downstream tubes for connecting the control valve with the check valves may be disposed near the cylinder-head cover along the array of the cylinders. The upstream tube, the downstream tubes, and the control valve are disposed in a space surrounded by the cylinder-head cover, the bottom surface of the air cleaner, and an air-fuel-mixture supplying device connected with the air cleaner. Thus, the associated parts of the secondary-air supplier are compactly arranged to further improve the layout in the vicinity of the engine.

According to another aspect of the present invention, a 4-cycle engine having a secondary-air supplier for supplying secondary air into exhaust ports includes camshafts which are axially supported by bearing housings and a cylinder head. Check-valve cells are provided between the bearing housings and a cylinder-head cover. Check valves of the secondary-air supplier are disposed in these check-valve cells. This structure allows an effective use of the dead spaces in the engine and also contributes to a more compact structure of the secondary-air supplier and the 4-cycle engine. Furthermore, components used exclusively for holding the check valves are not necessary, thus achieving reduction in the number of components.

The bearing housings may be bonded to the cylinder head so that secondary-air ducts extend through the bearing housings and the interior of the cylinder head to connect the check-valve cells with exhaust ports. Accordingly, the length of the secondary-air ducts is shortened to improve the negative-pressure response of the secondary-air supplier.

This 4-cycle engine may include a secondary-air inlet having a union-like structure that extends from each check-valve cell to the exterior of the cylinder-head cover parallel to the bonding surface of the cylinder-head cover and the cylinder head, thereby contributing to a more compact structure of the secondary-air supplier.

This 4-cycle engine may be an in-line, multi-cylinder double-overhead-cam engine. In this case, each bearing housing may include first and second groups of bearing caps. The first group may be provided along the axial direction of an intake camshaft and the second group may be provided along the axial direction of an exhaust camshaft. Each bearing housing may be provided with a connecting segment for connecting the first and second groups. The connecting segment may be provided with check-valve cells which may be disposed between the intake camshaft and the exhaust camshaft. This also allows an effective use of the dead spaces in the engine and achieves a more compact structure of the secondary-air supplier. Furthermore, accessibility to tappets of the intake and exhaust valves is improved to achieve a higher maintenance ability of the engine.

This 4-cycle engine may further include check-valve-cell gaskets formed of an elastic material disposed between the cylinder-head cover and the bearing housing so that the gasket elastically supports the cylinder-head cover in the central region thereof. This suppresses the noise caused by the vibration in the undersurface of the cylinder-head cover and contributes to noise reduction of the 4-cycle engine.

In this 4-cycle engine, the check-valve cells may be provided near corresponding plug openings formed in the cylinder-head cover. Plug-opening gaskets provided along the corresponding plug openings may be integrated with the check-valve-cell gaskets to form gasket composites. Thus, small rubber parts are combined together to reduce the number of gasket-associated components, whereby recyclability is dramatically improved.

This 4-cycle engine may further include a head-cover gasket disposed between the cylinder head and the cylinder-head cover. One of the gasket composites may be integrated with the head-cover gasket via a connecting part. The connecting part may be provided with a margin which compensates for the height difference between the gasket composite and the head-cover gasket. This allows the integration of the gasket composite and the head-cover gasket, both of which having different mounting heights, so as to reduce the number of components and to improve the recyclability of the components.

The check valves may be engaged laterally with the inner peripheral sections of the check-valve-cell gaskets so that the valves are disposed parallel to the major plane of the gasket. The check-valve-cell gaskets may be engaged vertically with the cylinder-head cover. This prevents the check valves and the check-valve-cell gaskets from falling out during the installation of the cylinder-head cover so as to improve the assembly of components.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DESCRIPTION OF THE PREFERRED EMBODIMENT

An embodiment of the present invention will now be described with reference to the drawings.

Figure 1:
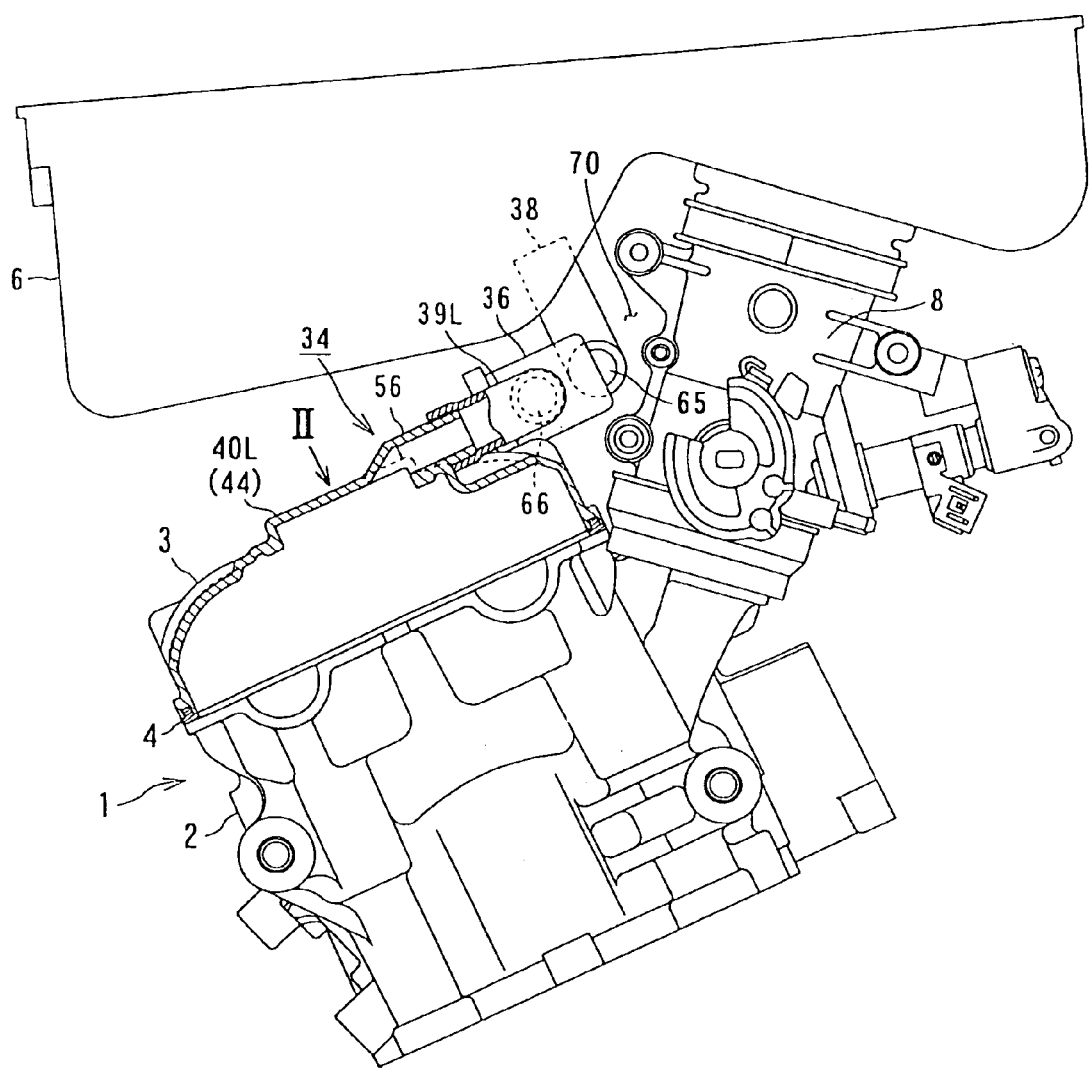
FIG. 1 is a left side view of an upper portion of a 4-cycle engine according to the present invention.
Figure 2:
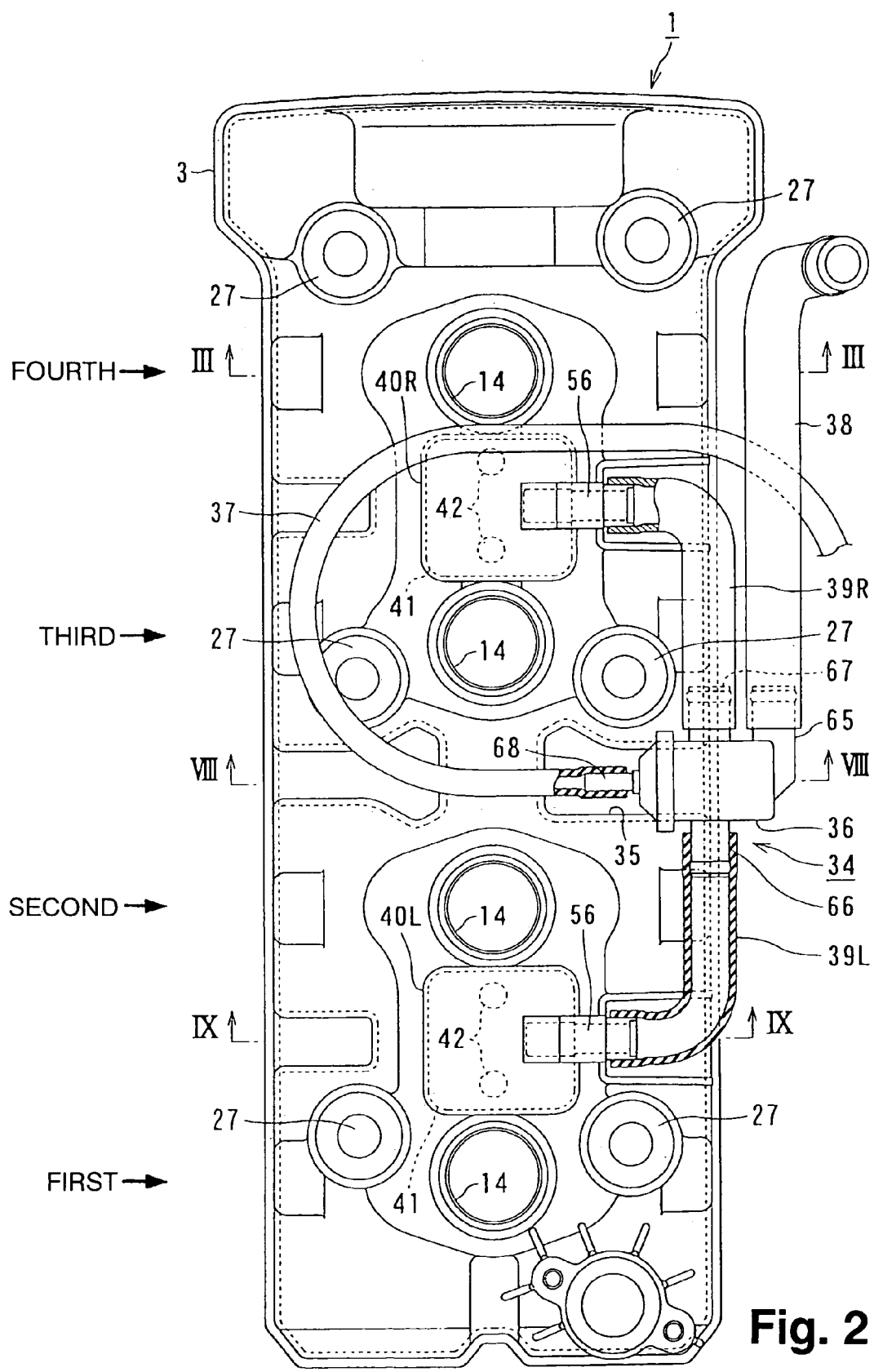
FIG. 2 is a plan view of a section indicated by an arrow II in FIG. 1, showing an embodiment of the present invention.
Figure 3:
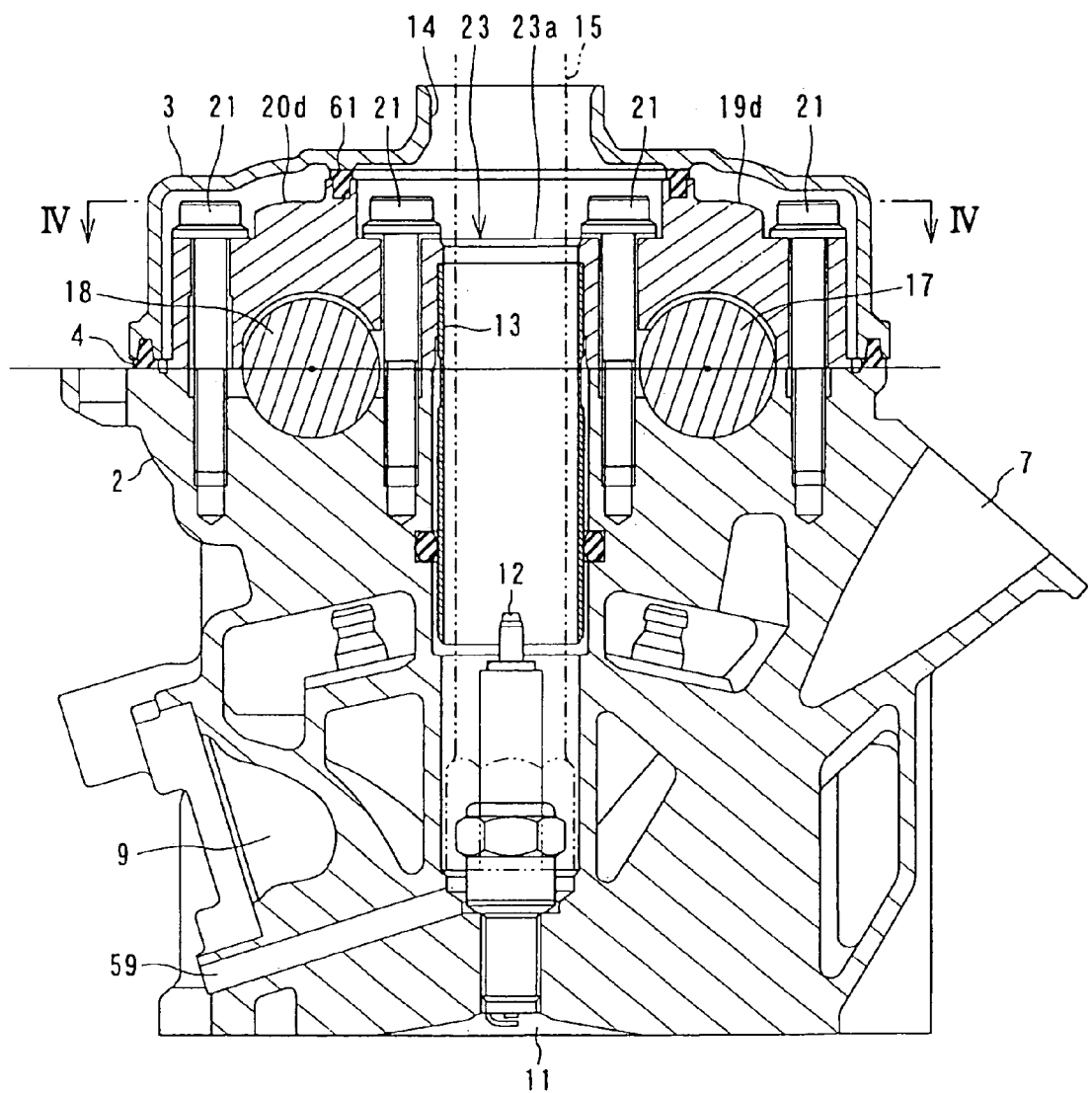
FIG. 3 is a vertical cross-sectional view taken along line III—III of FIG. 2.
Figure 4:
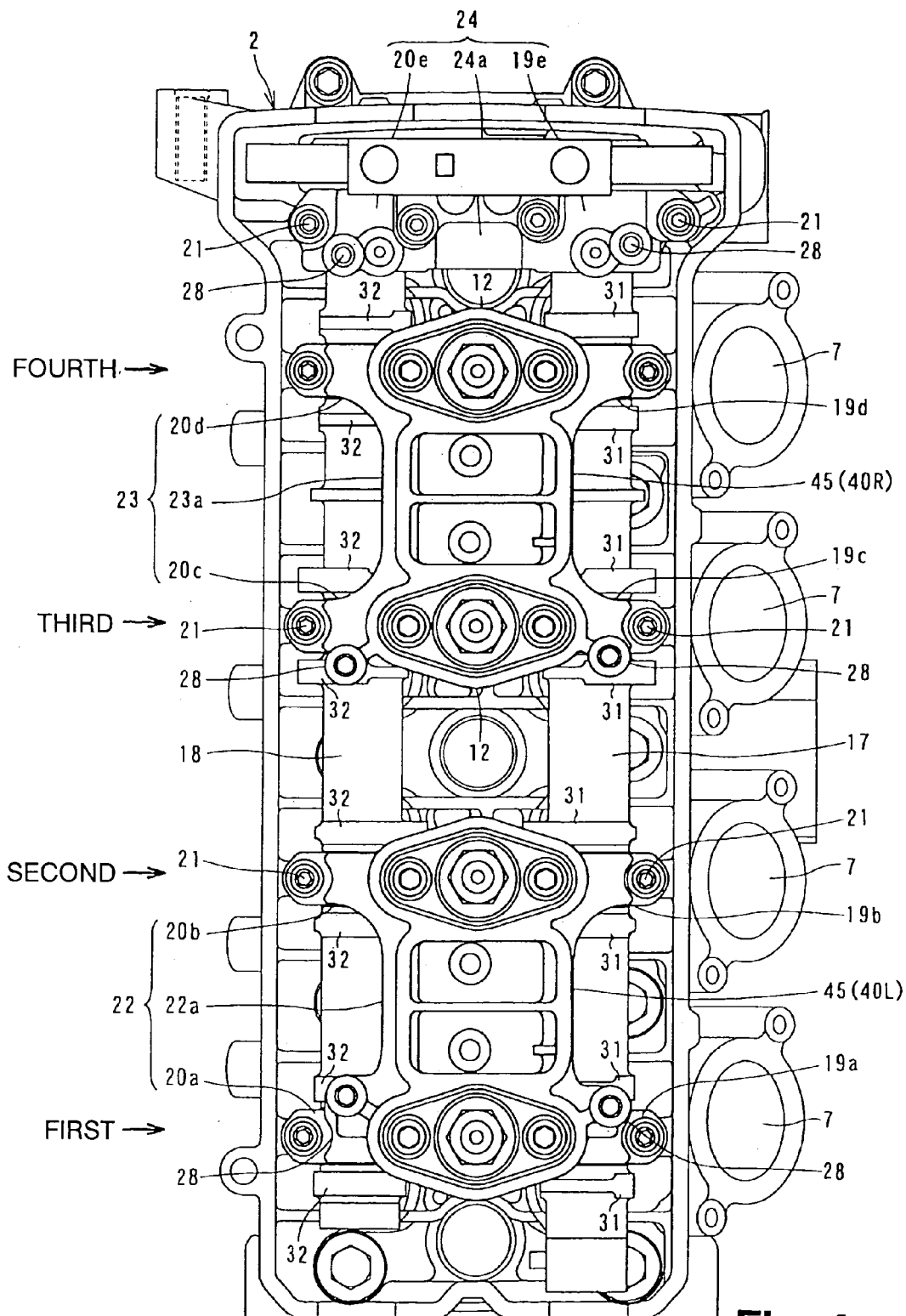
FIG. 4 is a horizontal cross-sectional view taken along line IV—IV of FIG. 3.

FIG. 1 is a left side view of an upper portion of a 4-cycle engine according to the present invention. FIG. 2 is a plan view of a section indicated by an arrow II in FIG. 1. FIG. 3 is a vertical cross-sectional view taken along line III—III of FIG. 2. FIG. 4 is a horizontal cross-sectional view taken along line IV—IV of FIG. 3.

A 4-cycle engine 1 installed in a body of a motorcycle is, for example, an in-line, four-cylinder double-overhead-cam (DOHC) 4-valve engine having a cylinder head 2 and a cylinder-head cover 3 disposed on an engine block which is not shown in the drawings. The cylinder head 2, the cylinder-head cover 3, and the engine block are disposed in forward-tilted positions on a crankcase which is also not shown in the drawings. A head-cover gasket 4 formed of an elastic material, such as a heat-and-oil-resistant rubber, is disposed between the cylinder head 2 and the cylinder-head cover 3.

An air cleaner 6 is provided above the 4-cycle engine 1. Four intake ports 7 (see FIG. 4) are disposed on the back surface of the cylinder head 2 and are connected with a throttle body 8. An upstream region of the throttle body 8 is connected with the bottom surface of the air cleaner 6. Four exhaust ports 9 disposed on the front surface of the cylinder head 2 are connected with exhaust ducts which are not shown in the drawings.

Referring to FIG. 3, one of four combustion chambers 11 provided in the undersurface of the cylinder head 2 is shown. Each of the combustion chambers 11 is connected with a corresponding intake port 7 and a corresponding exhaust port 9. A spark plug 12 is screwed at the center of the chamber 11 using a spark plug socket wrench 15. The cylinder head 2 includes insert channels 13 each of which corresponds to one of the spark plugs 12, and the cylinder-head cover 3 includes plug openings 14 each of which corresponds to one of the insert channels 13. Four cylinders indicated by the terms "first", "second", "third", and "fourth" are in the order from the left with respect to the moving direction of the motorcycle.

Referring to FIG. 4, an intake camshaft 17 and an exhaust camshaft 18, respectively, are axially supported by five bearing caps 19a to 19e and five bearing caps 20a to 20e in a rotatable manner in the cylinder head 2. Both groups of the bearing caps 19a to 19e and 20a to 20e are provided along the axial direction of the respective camshafts 17 and 18. Each of the corresponding bearing caps 19a and 20a, 19b and 20b, 19c and 20c, 19d and 20d, and 19e and 20e is fixed to the cylinder head 2 by two bolts 21.

Figure 5:
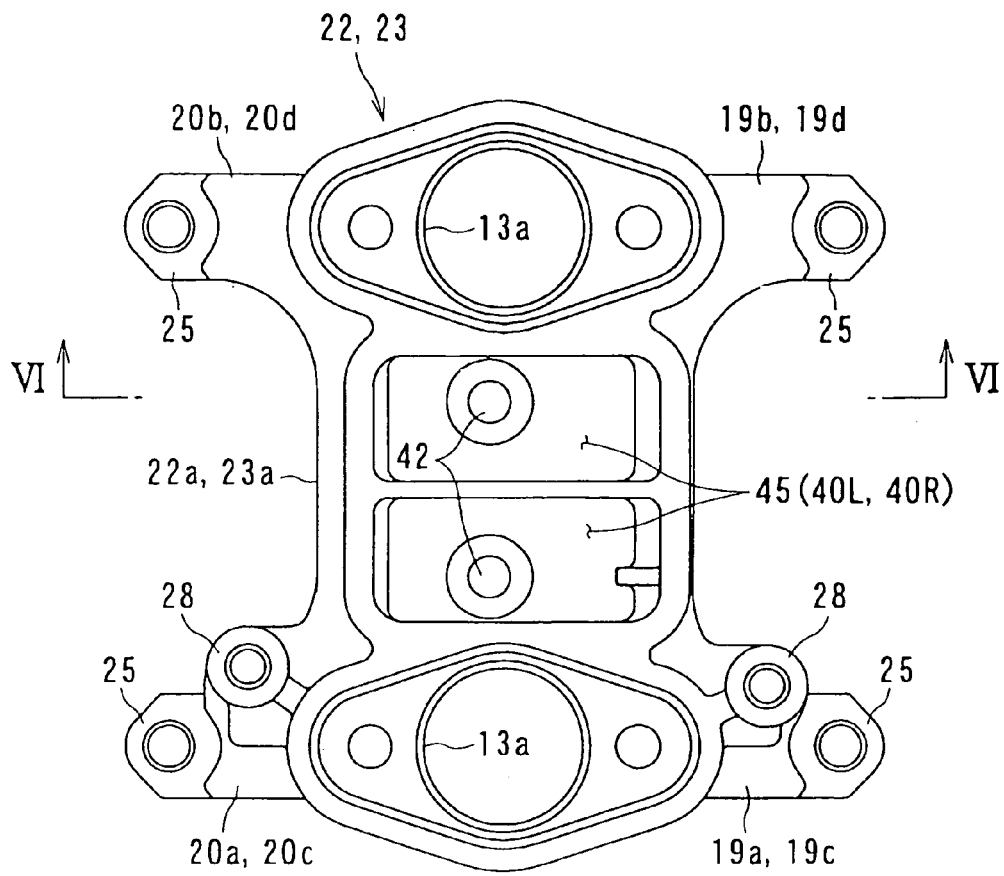
FIG. 5 is a plan view of a bearing housing which includes bearing caps according to an embodiment of the present invention.
Figure 6:
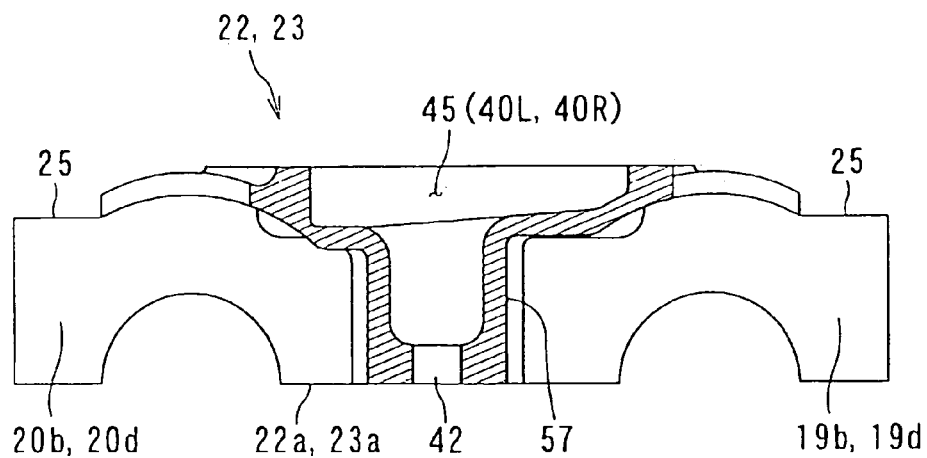
FIG. 6 is a cross-sectional view taken along line VI—VI of FIG. 5.

Referring to FIGS. 4 to 6, the bearing caps 19a, 19b, 20a, and 20b are connected together by a connecting segment 22a to form a bearing housing 22; the bearing caps 19c, 19d, 20c, and 20d are connected together by a connecting segment 23a to form a bearing housing 23; and bearing-caps 19e and 20e are connected together by a connecting segment 24a to form a bearing housing 24. On each side of corresponding pairs of the bearing caps 19a and 20a, 19b and 20b, 19c and 20c, 19d and 20d, and 19e and 20e, a fastening hole 25 that corresponds to one of the bolts 21 is provided.

Figure 7:
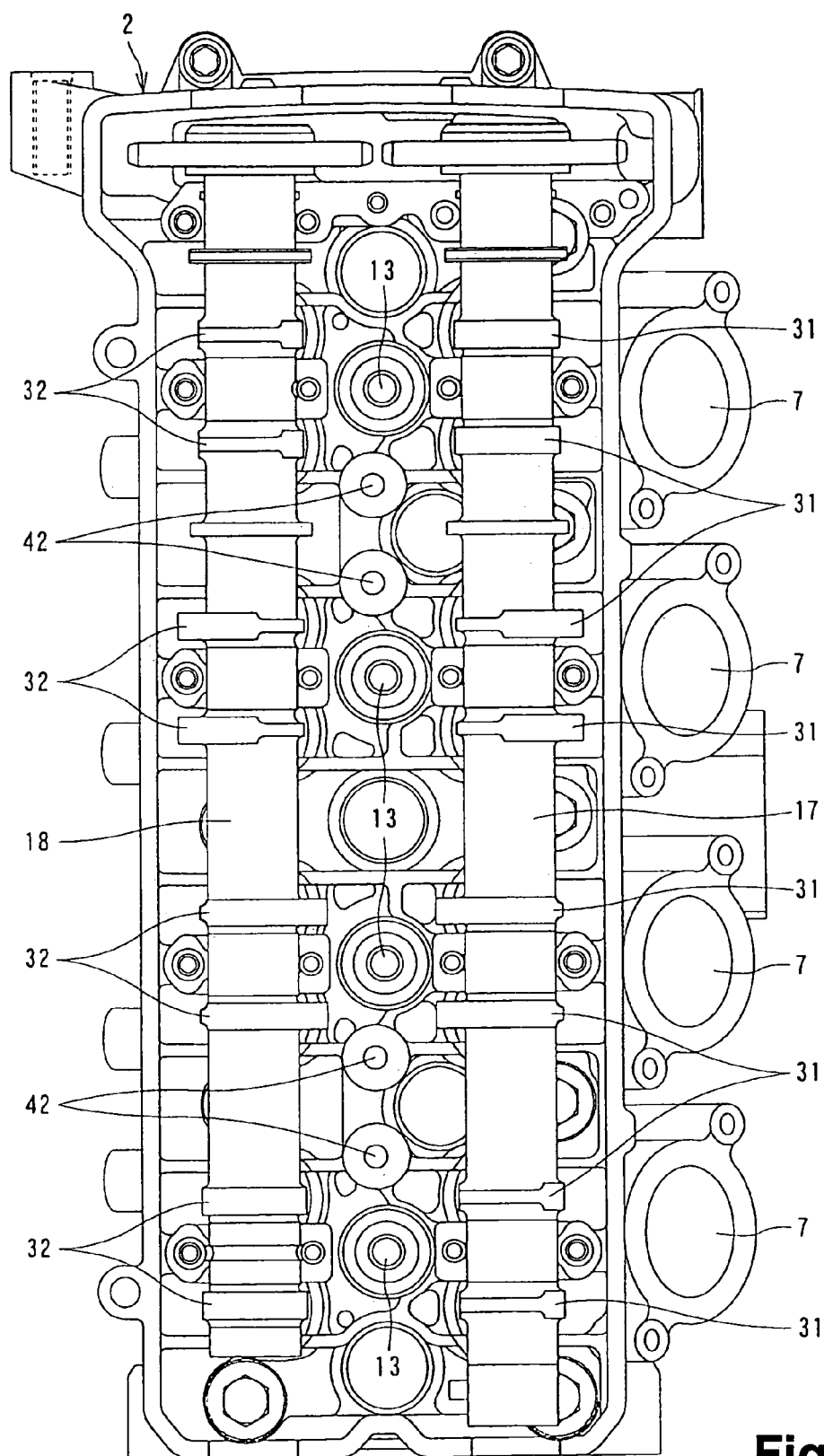
FIG. 7 is a plan view of a cylinder head without bearing housings according to an embodiment of the present invention.

The bearing housings 22 and 23 have a substantially sideways H-shape in plan view, and the bearing housing 24 has a substantially sideways I-shape in plan view. The bearing housings 22 and 23 each have openings 13a which are aligned with the corresponding insert channels 13 of the cylinder head 2. Referring to FIG. 7, a plan view of the cylinder head 2 without the bearing housings 22, 23 and 24 is shown.

Each of the bearing housings 22, 23, and 24 includes two fastening bosses 28 that fit in corresponding bolt-fastening holes 27 (see FIG. 2) of the head cover 3. Six head-cover fastening bolts, which are not shown in the drawings, are inserted through the holes 27 and are fastened to the bosses 28 so that the head cover 3 is fixed to the cylinder head 2. Each of the bosses 28 formed on the bearing housings 22, 23, and 24 is positioned substantially above the corresponding intake camshaft 17 or exhaust camshaft 18.

The intake camshaft 17 is provided with two intake cams 31 for every cylinder, that is, a total of eight intake cams 31. Likewise, the exhaust camshaft 18 is provided with two exhaust cams 32 for every cylinder, that is, a total of eight exhaust cams 32. These cams 31 and 32 open and close respective intake and exhaust valves, which are not shown in the drawing, at a predetermined timing to actuate the 4-cycle engine 1.

The 4-cycle engine has a secondary-air supplier 34 that supplies secondary air to the exhaust ducts that lead to the exhaust ports 9. Referring to FIG. 2, the secondary-air supplier 34 includes a recess 35 formed on the cylinder-head cover 3 for holding a control valve 36; a vacuum pipe 37; an upstream tube 38; downstream tubes 39L and 39R; check-valve cells 40L and 40R in which check valves 41 are disposed; and secondary-air ducts 42.

Figure 8:
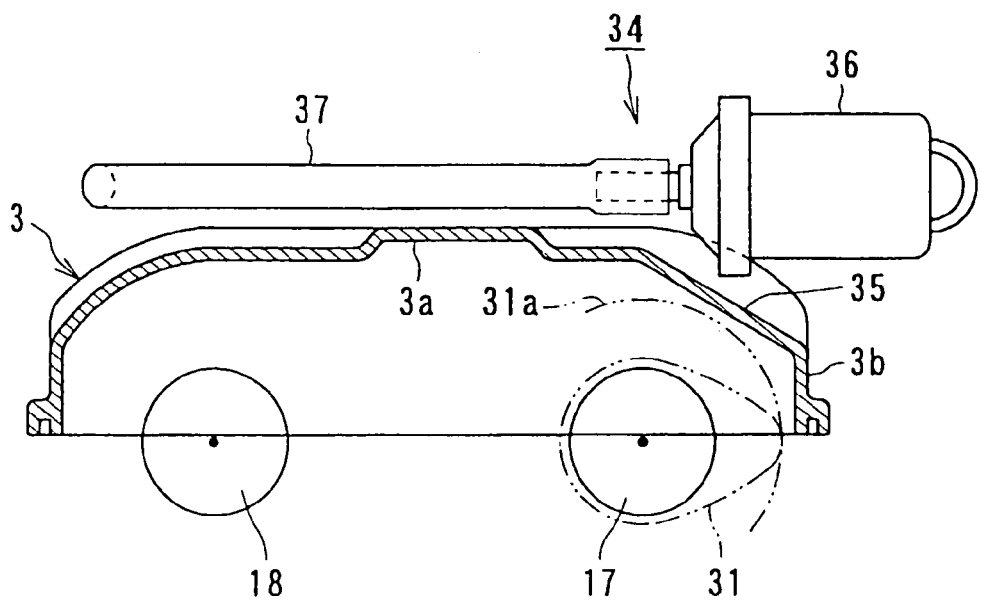
FIG. 8 is a cross-sectional view taken along line VIII—VIII of FIG. 2.

Referring to FIG. 2, the recess 35 is disposed between the second and the third cylinders, and particularly, between the intake cams 31 of the two cylinders. Referring to FIG. 8, the recess 35 is disposed at an edge defined by a top surface 3a and one of side surfaces 3b of the cylinder-head cover 3 in a state such that the recess 35 is depressed toward the engine.

From an axial view of the intake camshaft 17, the recess 35 is formed near the rotating orbit 31a of the lobe tip of one of the intake cams 31, or is further depressed towards the engine. The control valve 36 is disposed in the recess 35.

The check valves 41 are connected to the downstream tubes of the control valve 36. Referring to FIGS. 2 and 4, one of the check valves 41 and the check-valve cell 40L are disposed between the first cylinder and the second cylinder, and the other check valve 41 and the check-valve cell 40R are disposed between the third cylinder and the fourth cylinder.

Figure 9:
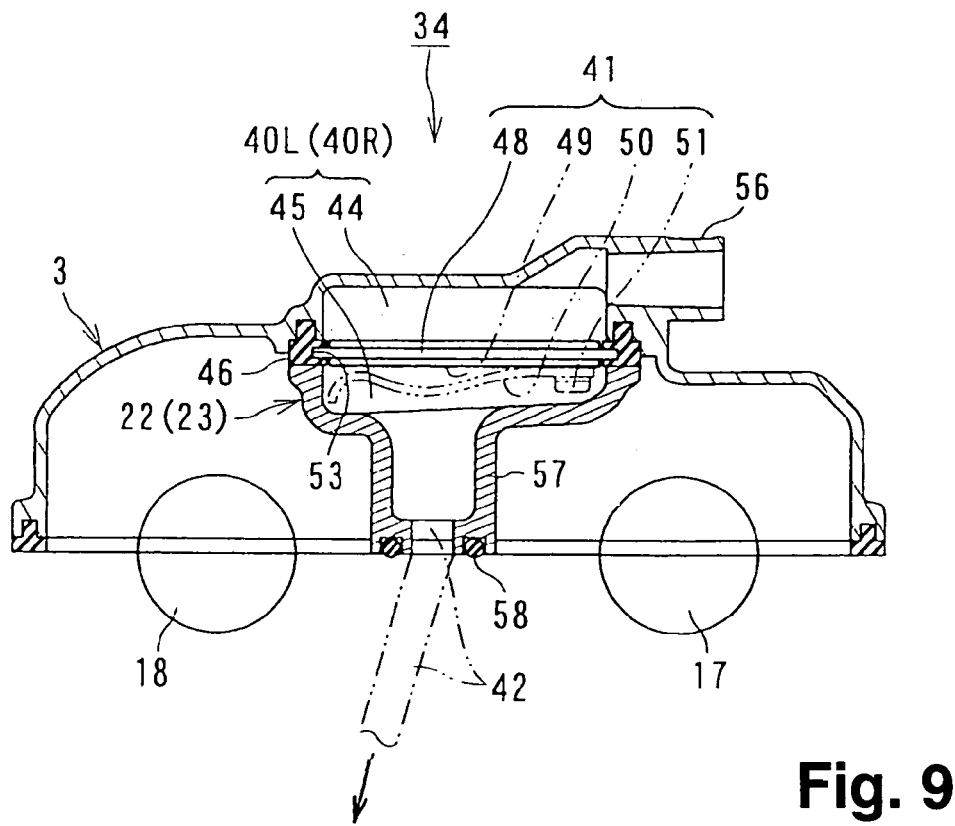
FIG. 9 is a cross-sectional view taken along line IX—IX of FIG. 2.

Referring to FIG. 9, the check-valve cell 40L is provided between the cylinder-head cover 3 and the bearing housing 22, and likewise, the check-valve cell 40R is provided between the cylinder-head cover 3 and the bearing housing 23. A pair of upper chambers 44 is provided on the left and right portions of the cylinder-head cover 3 and forms protrusions on the cylinder-head cover 3. A pair of lower chambers 45 is provided in each of the connecting segments 22a and 23a of the bearing housing 22 and 23 and forms depressions on the connecting segments 22a and 23a. A check-valve-cell gasket 46 formed of an elastic material, such as a heat-and-oil-resistant rubber, is disposed between each bonding surface between the upper chamber 44 and the two lower chambers 45 to hermetically partition the chambers.

The inner peripheral section of each gasket 46 engages with the corresponding check valve 41 to partition the upper chamber 44 from the two lower chambers 45. The check-valve cells 40L and 40R are disposed between the intake camshaft 17 and the exhaust camshaft 18 in plan view (see FIG. 4), and are also provided near the plug openings 14 on the cylinder-head cover 3.

Referring to FIG. 9, each check valve 41 includes reeds 49 and reed stoppers 50 fastened together with screws 51 on the undersurface of a valve board 48, which is the main component of the check valve 41. Each of the two valve boards 48 is engaged with the inner peripheral section of the gasket 46. The reed stopper 50 regulates the maximum opening of the reed 49. For each valve board 48, two reeds 49 and two reed stoppers 50 are provided so that a total of four reeds 49 and four reed stoppers 50 are disposed along the array of the cylinders.

The valve board 48 is laterally inserted into a groove 53 formed in the inner peripheral section of the gasket 46 so that the board 48 is engaged with the gasket 46 parallel to the major plane thereof. The gasket 46 is inserted in the upward direction toward the undersurface of the cylinder-head cover 3 to be engaged vertically with the cylinder-head cover 3. Thus, the gasket 46 elastically supports the cylinder-head cover 3 in the central region thereof, that is, near the upper chamber 44.

The top surface of the upper chamber 44 of each of the check-valve cells 40L and 40R has a secondary-air inlet 56 that extends through the cylinder-head cover 3 to the exterior thereof. The secondary-air inlet 56 has a union-like structure that extends to the rear parallel to the bonding surface of the cylinder-head cover 3 and the cylinder head 2.

Referring to FIGS. 6 and 9, the bearing housings 22 and 23 are each provided with depressed portions 57 which extend downward from the bottom surfaces of the two lower chambers 45. The undersurfaces of the depressed portions 57 are bonded to the cylinder head 2 by O-rings 58. A pair of secondary-air ducts 42 provided in each of the check-valve cells 40L and 40R extends through the depressed portions 57 of the bearing housings 22 and 23 and also through the interior of the cylinder head 2 so as to connect the check-valve cells 40L and 40R with the corresponding exhaust ports 9.

Referring to FIG. 9, each duct 42 is disposed directly under one of the reeds 49 and adjacent to the free end of the reed 49, that is, toward the front of the engine. This allows the air current passing through the reed 49 to smoothly flow into the duct 42.

Referring to FIG. 3, each insert channel 13 has a drain passage 59 for draining, for example, rain water from the bottom surface of the insert channel 13 to the exterior region near the exhaust port 9.

Figure 10:
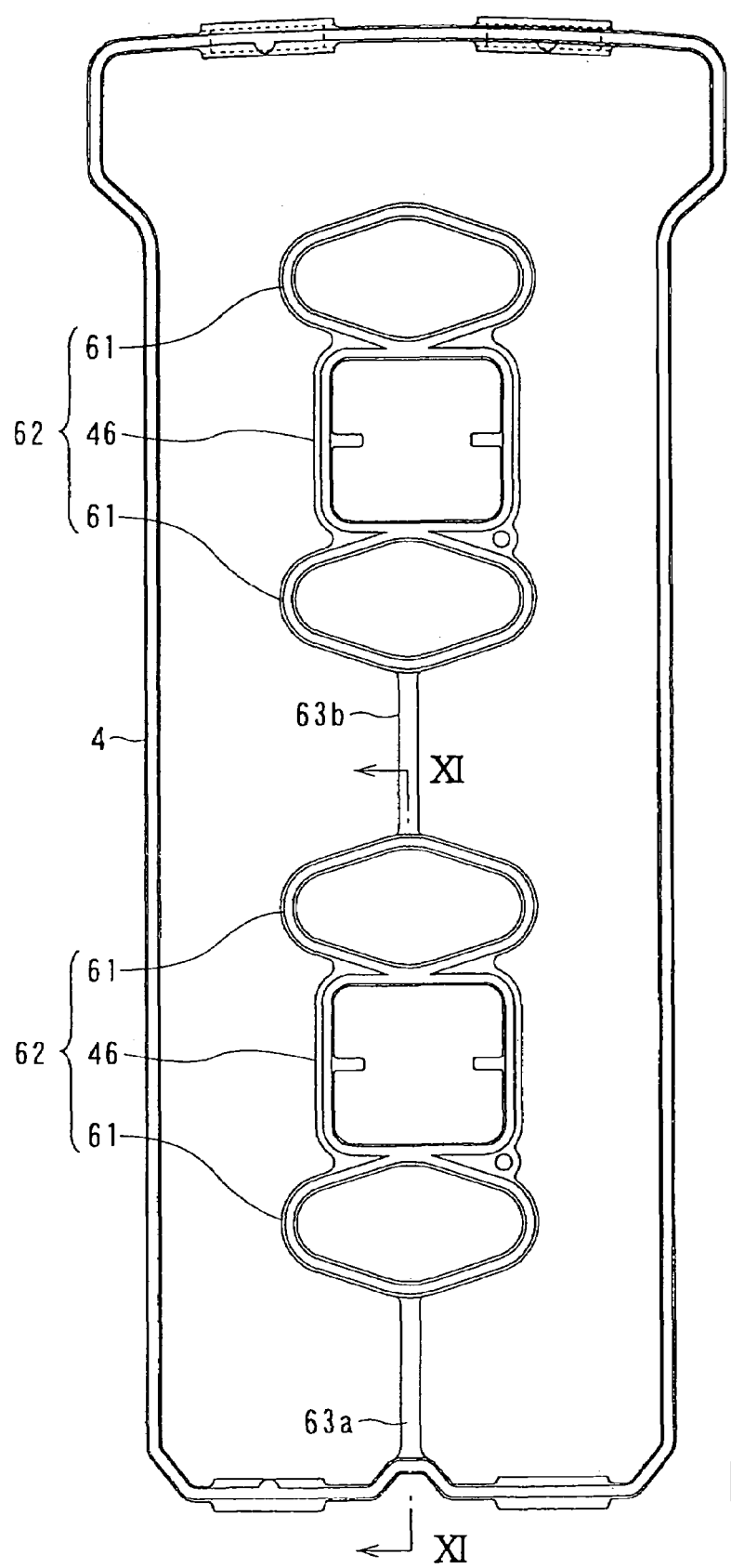
FIG. 10 is a plan view of a head-cover gasket and gasket composites according to an embodiment of the present invention.
Figure 11:
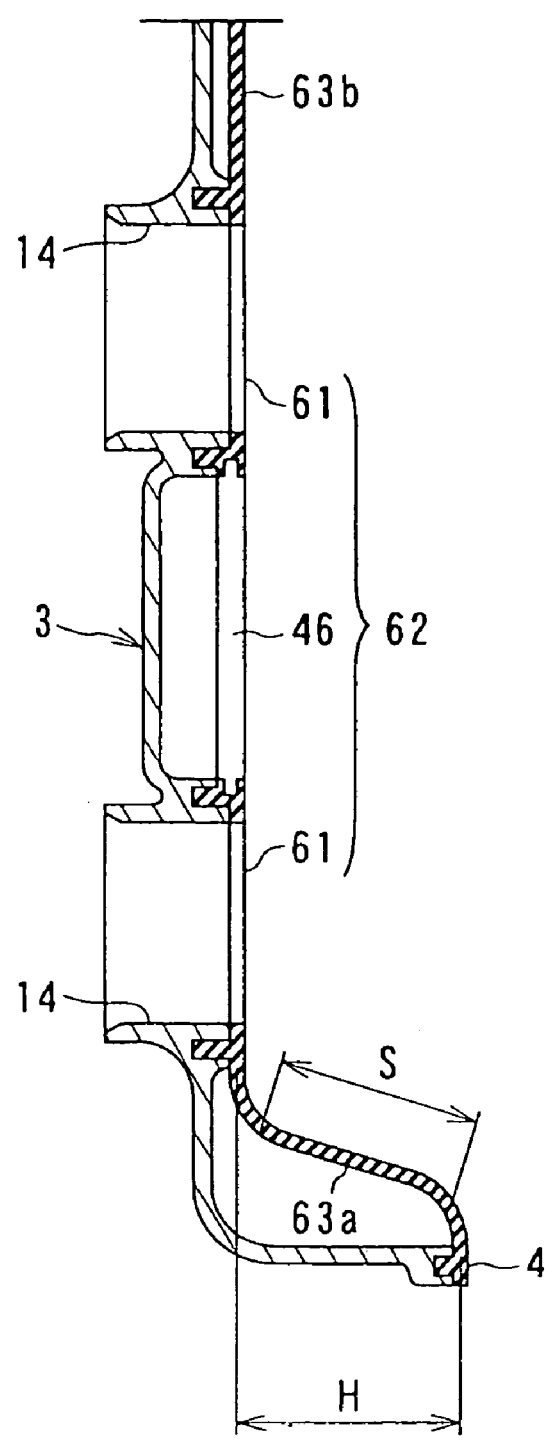
FIG. 11 is a cross-sectional view taken along line XI—XI of FIG. 10.

Also, referring to FIG. 3, a plug-opening gasket 61 formed of an elastic material is disposed between each plug opening 14 and the cylinder-head cover 3. Referring to FIGS. 10 and 11, the plug-opening gaskets 61 are integrated with the check-valve-cell gasket 46 to form a pair of gasket composites 62.

The left gasket composite 62 is connected with the left edge of the head-cover gasket 4 via a connecting part 63a having a belt-like structure. Similarly, the left and right gasket composites 62 are connected to each other via a belt-like connecting part 63b. Referring to FIG. 11, a margin S of the connecting part 63a compensates for the height difference H between the left gasket composite 62 and the head-cover gasket 4.

Referring to FIGS. 1 and 2, the upstream tube 38 and the downstream tubes 39L and 39R are, for example, rubber hoses having a substantial L-shape. The upstream tube 38 connects the bottom surface of the air cleaner 6 to a union 65 formed on the rear surface of the control valve 36. Unions 66 and 67 protrude horizontally in opposite directions from the control valve 36 and are connected with the respective downstream tubes 39L and 39R. The downstream tubes 39L and 39R are connected to the corresponding secondary-air inlets 56 of the respective check-valve cells 40L and 40R.

The vacuum pipe 37 extends towards the front from a nipple 68 formed at the front portion of the control valve 36 and then curves back. The vacuum pipe 37 is connected to a section to which the negative pressure is applied, which is, for example, the downstream region of a throttle valve in the throttle body 8. The vacuum pipe 37, the upstream tube 38, and the downstream tubes 39L and 39R are all disposed in a manner so as not to overlap with the bolt-fastening holes 27 and the spark plugs 12.

The upstream tube 38 and the downstream tubes 39L and 39R are disposed near the cylinder-head cover 3 along the array of the cylinders. Referring to FIG. 1, the tubes 38, 39L, and 39R and the control valve 36 are disposed in a space 70 surrounded by the cylinder-head cover 3, the bottom surface of the air cleaner 6, and an air-fuel-mixture supplying device, that is, the throttle body 8 connected with the air cleaner 6.

In the secondary-air supplier 34, when the 4-cycle engine 1 is in operation, the negative pressure applied to the downstream region of the throttle body 8 affects the control valve 36 through the vacuum pipe 37 so as to open the control valve 36. This allows the air in the air cleaner 6 to be supplied towards the exhaust ports 9 as secondary air via the upstream tube 38, the downstream tubes 39L and 39R, the check-valve cells 40L and 40R, and the secondary-air ducts 42. In this case, the reeds 49 of the check valves 41 open and close according to the exhaust pulses to prevent the backflow of the exhaust gas in the secondary-air ducts 42.

The secondary air supplied towards the exhaust ports 9 spontaneously ignites unburned elements contained in the exhaust gas so that the elements are burned completely to purge the exhaust gas.

The 4-cycle engine 1 of the present invention has the recess 35 which is provided in the cylinder-head cover 3 and is depressed toward the engine for holding the control valve 36. Because the control valve 36 of the secondary-air supplier 34 is disposed in this recess 35, the control valve 36 is prevented from protruding largely from the cylinder-head cover 3. Thus, the layout in the vicinity of the engine is much less limited, and a compact secondary-air supplier 34 is provided without reducing the volume of the air cleaner 6.

The positioning of the recess 35 and the control valve 36 between the second and the third cylinders, the check-valve cell 40L and the check valve 41 thereof between the first and the second cylinders, and the check-valve cell 40R and the check valve 41 thereof between the third and the fourth cylinders prevents the control valve 36 and the check valves 41 from protruding largely from the cylinder-head cover 3. A compact, secondary-air supplier 34 can thus be provided.

As described above, the recess 35 is disposed at an edge defined by the top surface 3a and one of the side surfaces 3b of the cylinder-head cover 3 and is provided between the two intake cams 31 of the adjacent second and third cylinders. Because the recess 35 is disposed near the rotating orbit 31a of the lobe tip of one of the intake cams 31 viewed from an axis of the intake camshaft 17, the dead spaces in the engine are used effectively to improve the layout in the vicinity of the engine.

As described above, the upstream tube 38 and the downstream tubes 39L and 39R are disposed near the cylinder-head cover 3 along the array of the cylinders and are connected to the control valve 36. Because the tubes 38, 39L, and 39R and the control valve 36 are disposed in the space 70, the associated parts of the secondary-air supplier 34 are compactly arranged to further improve the layout in the vicinity of the engine.

The positioning of the check-valve cells 40L and 40R between the cylinder-head cover 3 and the respective bearing housings 22 and 23 allows an effective use of the dead spaces in the engine and also contributes to a more compact structure of the secondary-air supplier 34 and the 4-cycle engine 1. Furthermore, components used exclusively for holding the check valves 41 are not necessary, thus achieving reduction in the number of components.

As described above, the bearing housings 22 and 23 have a substantial sideways H-shape connecting the bearing caps 19a to 19d provided along the axial direction of the intake camshaft 17 with the respective bearing caps 20a to 20d provided along the axial direction of the exhaust camshaft 18. The connecting segments 22a and 23a each have the lower chambers 45 in one of the respective check-valve cells 40L and 40R. The check-valve cells 40L and 40R are disposed between the intake camshaft 17 and the exhaust camshaft 18. This also allows an effective use of the dead spaces in the engine and achieves a more compact structure of the secondary-air supplier 34. Furthermore, accessibility to tappets of the intake and exhaust valves is improved to achieve a higher maintenance ability of the engine.

As described above, the depressed portions 57 of the bearing housings 22 and 23 are bonded to the cylinder head 2. The secondary-air ducts 42 connect the check-valve cells 40L and 40R with the corresponding exhaust ports 9 through the depressed portions 57 and through the interior of the cylinder head 2. Thus, the length of the secondary-air ducts 42 is shortened to improve the negative-pressure response of the secondary-air supplier 34.

The secondary-air inlets 56 of the check-valve cells 40L and 40R have union-like structures which extend parallel to the bonding surface of the cylinder-head cover 3 and the cylinder head 2. Accordingly, the length and the height of the downstream tubes 39L and 39R connected with these inlets 56 are reduced, thereby contributing to a more compact structure of the secondary-air supplier 34.

The check-valve-cell gaskets 46 formed of an elastic material disposed in the bonding surfaces of the cylinder-head cover 3 and the bearing housings 22 and 23 elastically support the central region of the undersurface of the cylinder-head cover 3. This suppresses the noise caused by the vibration in the undersurface of the cylinder-head cover 3 and contributes to the noise reduction of the 4-cycle engine 1.

The check-valve-cell gaskets 46 are integrated with the plug-opening gaskets 61 to form a pair of gasket composites 62. The gasket composites 62 are integrated with the head-cover gasket 4 via connecting parts 63a and 63b having belt-like structures. Thus, small rubber parts are combined together to reduce the number of gasket-associated components, whereby recyclability is dramatically improved.

The margin S of the connecting part 63a compensates for the height difference H between one of the gasket composites 62 and the head-cover gasket 4. This allows the integration of the gasket composite 62 and the head-cover gasket 4, both of which having different mounting heights, so as to reduce the number of components and to improve the recyclability of the components.

Each check valve 41 engages with the inner peripheral section of the check-valve-cell gasket 46. This means that the check valve 41 is laterally inserted into the gasket 46 so that the valve 41 is engaged with the gasket 46 parallel to the major plane thereof. The gasket 46 is inserted in the upward direction toward the undersurface of the cylinder-head cover 3 to be engaged vertically with the cylinder-head cover 3. This prevents the check valves 41 and the check-valve-cell gaskets 46 from falling out during the installation of the cylinder-head cover 3 so as to improve the assembly of components.

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A 4-cycle engine for a motorcycle, the engine comprising:
    at least four cylinders arranged in a line, the at least four cylinders comprising two innermost cylinders and two outermost cylinders;
    a cylinder-head cover;
    a secondary-air supplier comprising:
        a control valve disposed between the two innermost cylinders;
        check valve cells disposed between the two outermost and innermost cylinders respectively; and
        downstream tubes for connecting a downstream region of the control valve with the check valve, the downstream tubes extending in opposite directions from the control valve and disposed near the cylinder-head cover parallel to the line of the cylinders; and
    at least one exhaust port,
    wherein the secondary-air supplier supplies secondary air to the exhaust port.

2. The 4-cycle engine according to claim 1, further comprising a recess in the cylinder head cover;
    wherein the recess holds the control valve therein.

3. The 4-cycle engine according to claim 2, further comprising:
    at least one camshaft, and
    a plurality of cams disposed on the at least one camshaft,
    wherein the recess is disposed at an edge defined by a top surface and one side surface of the outer surface of the cylinder-head cover and is disposed between two cams of two adjacent cylinders, the recess being disposed near a rotating orbit of a lobe tip of one of the cams viewed from the axis of the camshaft on which the cam is disposed.

4. The 4-cycle engine according to claim 2, further comprising:
    an air cleaner; and
    an air-fuel-mixture supplying device,
    wherein the secondary-air supplier further comprises:
        an upstream tube for connecting the air cleaner with the control valve; and
    wherein the upstream tube extends from the air cleaner, is disposed near the cylinder-head cover parallel to the line of the cylinders, and is connected to the control valve; and
    wherein the control valve, the upstream tube, and the downstream tube are disposed in a space surrounded by the cylinder-head cover, a bottom surface of the air cleaner, and the air-fuel-mixture supplying device.

5. The 4-cycle engine according to claim 3, further comprising:
    an air cleaner; and
    an air-fuel-mixture supplying device,
    wherein the secondary-air supplier further comprises:
        an upstream tube for connecting the air cleaner with the control valve
    wherein the upstream tube extends from the air cleaner, is disposed near the cylinder-head cover parallel to the line of the cylinders, and is connected to the control valve; and
    wherein the control valve, the upstream tube, and the downstream tube are disposed in a space surrounded by the cylinder-head cover, a bottom surface of the air cleaner, and the air-fuel-mixture supplying device.

6. The 4-cycle engine according to claim 1, further comprising:
    an air cleaner;
    at least one camshaft;
    at least one bearing housing; and
    a cylinder head,
    wherein the camshaft is axially supported by the bearing housing and the cylinder head; and
    wherein the secondary air supplier further comprises:
        an upstream tube for connecting the air cleaner with the control valve; and
        a check-valve cell, the check-valve cell holding the check valve therein and comprising a lower chamber beneath the check valve and adjacent the bearing housing.

7. A 4-cycle engine for a motorcycle, the engine comprising:
    four cylinders arranged in a line, the four cylinders comprising two innermost cylinders and two outermost cylinders;
    a cylinder-head cover;
    a secondary-air supplier comprising:
        a control valve disposed between the two innermost cylinders;
        check-valve cells disposed between the innermost cylinder and the outermost cylinder respectively, the check-valve cells each having two check valves, and
        downstream tubes for connecting a downstream region of the control valve with the check valve cells, the downstream tube disposed near the cylinder-head cover parallel to the line of the cylinders; and
    exhaust ports, wherein the secondary-air supplier supplies secondary air to the exhaust ports.

8. The 4-cycle engine according to claim 7, wherein each check-valve comprises a reed and a reed stopper.

9. The 4-cycle engine according to claim 8, wherein a secondary air duct is provided below each reed to supply air to the exhaust ports.

10. A 4-cycle engine for a motorcycle, the engine comprising:
    four cylinders arranged in a line, the four cylinders comprising two innermost cylinders and two outermost cylinders;
    a cylinder-head cover;
    exhaust ports; and
    a secondary-air supplier supplying secondary air to the exhaust ports and comprising:
        a control valve disposed between the two innermost cylinders;
        check-valve cells disposed between the innermost cylinder and the outermost cylinder respectively, each of the check valve cells having two secondary air ducts extending therefrom and providing secondary air to one of the exhaust ports, and
        downstream tubes for connecting a downstream region of the control valve with the check valve cells, the downstream tube disposed near the cylinder-head cover parallel to the line of the cylinders.

* * * * *